United States Patent [19]
Coutu

[11] Patent Number: 5,225,756
[45] Date of Patent: Jul. 6, 1993

[54] STEPPER MOTOR DRIVER CIRCUIT

[75] Inventor: David J. Coutu, 85 N. Main St., Unit No. 53, East Hampton, Conn. 06424

[73] Assignee: David J. Coutu, East Hampton, Conn.

[21] Appl. No.: 858,224

[22] Filed: Mar. 26, 1992

[51] Int. Cl.⁵ .............................................. H02P 8/00
[52] U.S. Cl. ..................................... 318/696; 318/685
[58] Field of Search ................................ 318/685, 696

[56] References Cited

U.S. PATENT DOCUMENTS

| | | | |
|---|---|---|---|
| 4,297,625 | 10/1981 | Newell | 318/696 |
| 4,703,243 | 10/1987 | Ettelman et al. | 318/696 |
| 4,710,691 | 12/1987 | Bergstrom et al. | 318/696 |
| 4,855,660 | 8/1989 | Wright et al. | 318/696 |

OTHER PUBLICATIONS

Docket IMS-1 entitled "Stepper Motor Driver Circuit" filed Mar. 10, 1991, David J. Coutu.

Primary Examiner—William M. Shoop, Jr.
Assistant Examiner—Karen Masih

[57] ABSTRACT

A stepper motor driver circuit applies charging current to one phase of a two-phase stepper motor in a Sine wave configuration while simultaneously applying charging current to the opposing winding in a Cosine wave configuration to carefully control the position of the motor. To reduce memory storage requirements and therefore reduce size and cost, only quarter of the Sine and Cosine waveforms are stored in memory and with additional circuitry, reconstruction of the complete wave form is realized. Furthermore, the resulting circuitry provides the user with a Full Step position output thereby reducing the need for the controlling microprocessor to count micro-steps over long moves to monitor the motor position.

20 Claims, 4 Drawing Sheets

STEPPER MOTOR DRIVER CIRCUIT

BACKGROUND OF THE INVENTION

Stepper motor drivers ordinarily provide a step clock of a fixed frequency to activate circuitry in the driver electronics to sample and apply current to the windings or "phases" of the associated stepper motor. The amount of current to be applied is a direct function of the desired position of the motor shaft. For rotational motion, current is applied to opposing windings in a stepper motor in a quadrature manner. In a micro-stepping motor, phase currents are applied as a Sine wave to one phase and a Cosine wave to the opposing phase with motor position defined at discrete points along the Sine and Cosine waveforms. Data for the full Sine and Cosine waveforms are typically stored in local memory. Each pulse from an associated step clock, advances the motor to the next position, following the Sine and Cosine drive steps. For smooth motor rotation, the step clock is continuously applied at a fast rate, causing the motor to repetitively move through the micro-stepping sequence. To hold the motor at a fixed position, the motor driver must apply a constant current to each winding having a magnitude represented by the value of the Sine and Cosine waveform at the desired position. To monitor the position of the motor, the number of steps applied to the motor are counted within a control microprocessor.

To conserve energy, stepper motor drivers periodically apply and remove current to the motor windings since the constant application of current would otherwise result in excessive power consumption. Since the applied current decays with time after removal, positional phase current is periodically applied to each winding to hold the motor at a predetermined position. This is usually accomplished by switching a high voltage across each winding and allowing the current to increase until the motor reaches the predetermined value before rapidly switching off the voltage.

When applying operating current to a motor winding on the rising waveform edge, a high voltage is applied across the winding until the phase current in the winding reaches a predetermined reference value. On the falling edge of the current waveform, the current must be removed from the winding in order to replicate the Sine or Cosine waveform in the downward direction. This is usually accomplished using either a so-called "fast" or "slow" decay method. In the "fast" decay approach, the winding is connected to ground through a diode bridge. In the "slow" decay approach the low side of the winding is slightly below ground and the high side of the winding is slightly above ground resulting in a low voltage drop across the winding with reduced energy dissipation.

U.S. Pat. No. 4,297,625 describes the use of integrated circuit counters connected to operate in an incremental or decremental mode to sequentially access data words in a Sine memory and a Cosine memory.

U.S. patent application (IMS-1) entitled "Stepper Motor Driver Circuit" filed Mar. 10, 1992, describes a motor driver circuit that samples the current to each of the two windings in a two-phase stepper motor and alternately applies current to the windings in accordance with the alternate phases of the driver circuit clock to eliminate cross-interference between the windings. By selectively controlling the current to the two windings the rotational position of the motor is accurately controlled. The falling phase current in one winding, for example, is precisely regulated by determining the time constant from the rising phase current in the other winding. The motor driver circuit monitors and controls the phase currents within each winding to effectively reduce adverse motor resonance effects.

One purpose of this invention is to provide a stepper motor driver circuit that includes means for accurately reconstructing the Sine wave current applied to one winding and the Cosine wave current applied to the other winding without requiring a sizable memory to store the Sine and Cosine data words. Another purpose of the invention is to provide a circuit that provides motor location rather than counting microsteps to monitor motor position.

SUMMARY OF THE INVENTION

A wave-shaping circuit within a stepper motor driver circuit accurately constructs the Sine wave amplitude of the charging current applied to one winding of an associated stepper motor and the Cosine wave amplitude of the charging current applied to the opposite winding from stored data representing only a quarter of the full waveform. The respective Sine and Cosine waveforms for driving the charging currents are reproduced by storing a digitized representation of the waveform in a look-up table in an EPROM device The digitized data is clocked out of the EPROM by the control microprocessor when the motor is to be advanced one step. The output data from the EPROM is used as the input to a D/A converter to reproduce the analog representation of the Sine or Cosine waveform. According to this invention, the data stored in EPROM is the digitized portion of the respective waveform from 0 to 90 degrees. In conjuction with additional wave-shaping circuitry to control the direction of the counter clocking the data from the EPROM, the polarity of the data output from the D/A is switched positive or negative resulting in the reconstruction of the complete waveform over a full period of 360 degrees.

DESCRIPTION OF THE PREFERRED EMBODIMENT

Figure 1:
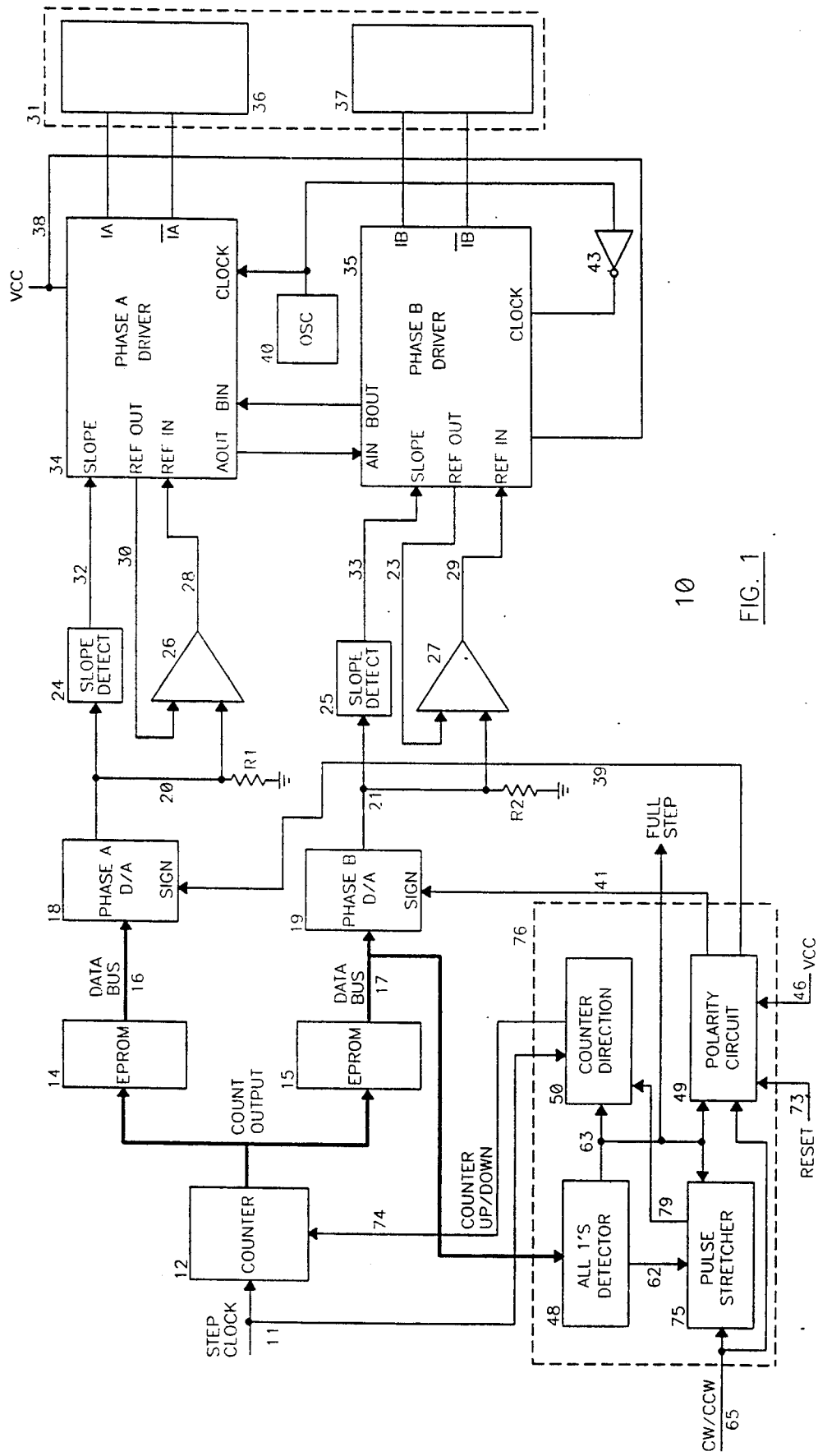
FIG. 1 is a diagrammatic representation of a stepper motor driver circuit employing the wave-shaping circuit according to the invention.

As described in the aforementioned U.S. patent application (IMS-1), and shown in FIG. 1, a high frequency driver clock from an oscillator 40 produces a gating pulse for separate phase A and phase B current pulses to the phase A winding 36 and phase B winding 37 of a stepper motor 31 wherein each phase current pulse responds to a half period of the driver clock frequency. Applying charging current to the phase A winding 36, for the duration of the A phase half period of the driver clock and applying charging current to the phase B winding 37 for the phase B half period of the driver clock insures that the phase A winding and phase B winding are alternatively energized for optimum stepper motor operation without causing any induced spike current to occur in either winding. This is accomplished by supplying the phase A winding with Sine wave current and the phase B winding with Cosine wave current by means of the stepper motor driver circuit 10. A step clock pulse on line 11 from a control microprocessor (not shown) is inputted to the CLK input of a binary counter 12 to advance the stepper motor 31 one step. The resulting count is produced on bus 13 and inputs as an address to a pair of first and second EPROMS 14 and 15 to produce a Sine wave from the first EPROM 14 and to produce a Cosine wave from the second EPROM 15.

The data for the digitized Sine and Cosine waveforms for the selected positions of the stepper motor are stored in EPROMs 14 and 15 and output from the EPROMs over data busses 16 and 17 to corresponding D/A converters 18 and 19. The D/A converters generate output current on lines 20 and 21 proportional to the input data from the EPROMs. The output currents from the D/A converters then pass through burden resistors $R_1$ and $R_2$ producing a pair of reference voltage signals which corresponds to the desired Sine and Cosine currents in the manner described within the aforementioned U.S. patent application (IMS-1).

By determining the position and direction of the Sine and Cosine data in real time, the wave-shaping circuitry 76 controls the count up/down direction of the counter 12 over conductor 74 and controls the sign to the D/A converters 18, 19 through conductors 39, 41 respectively. Input to the wave shaping circuit 76 is received from the control microprocessor over the step clock conductor 11, motor direction conductor 65 and reset conductor 73 as indicated in FIG. 1. The motor direction input received on conductor 65 is applied to a pulse stretcher circuit 75 which provides a pulse to both the counter direction circuit 50 hereafter "counter circuit" and to the polarity sensing circuit 49 hereafter "polarity circuit" over conductor 72 when the logic level on conductor 65 changes state. A 1's and 0's detector circuit 48, hereafter "detector circuit" receives input from the Cosine EPROM 15 over data bus 17. The detector circuit outputs a logic 1 over conductor 63 to counter circuit 50, the control microprocessor, and polarity circuit 49 when the data from the EPROM 15 is either all 1's or all 0's. This logic 1 is an indication that the motor is in a full step position with respect to the Sine and Cosine waveforms.

The detector circuit 48 in turn provides input to the polarity circuit 49 which determines the polarity of both the Sine and Cosine currents and inputs this data to the D/A converters 18 and 19 over conductors 39 and 41 respectively. The detector circuit 48 determines the full step positions of the Sine and Cosine currents whereas the polarity circuit 49 determines the sign of the Sine and Cosine currents. The operation of the wave-shaping circuit and EPROM data to reconstruct the Sine wave and Cosine waveforms is best seen by referring now to FIGS. 2–4.

Figure 2:
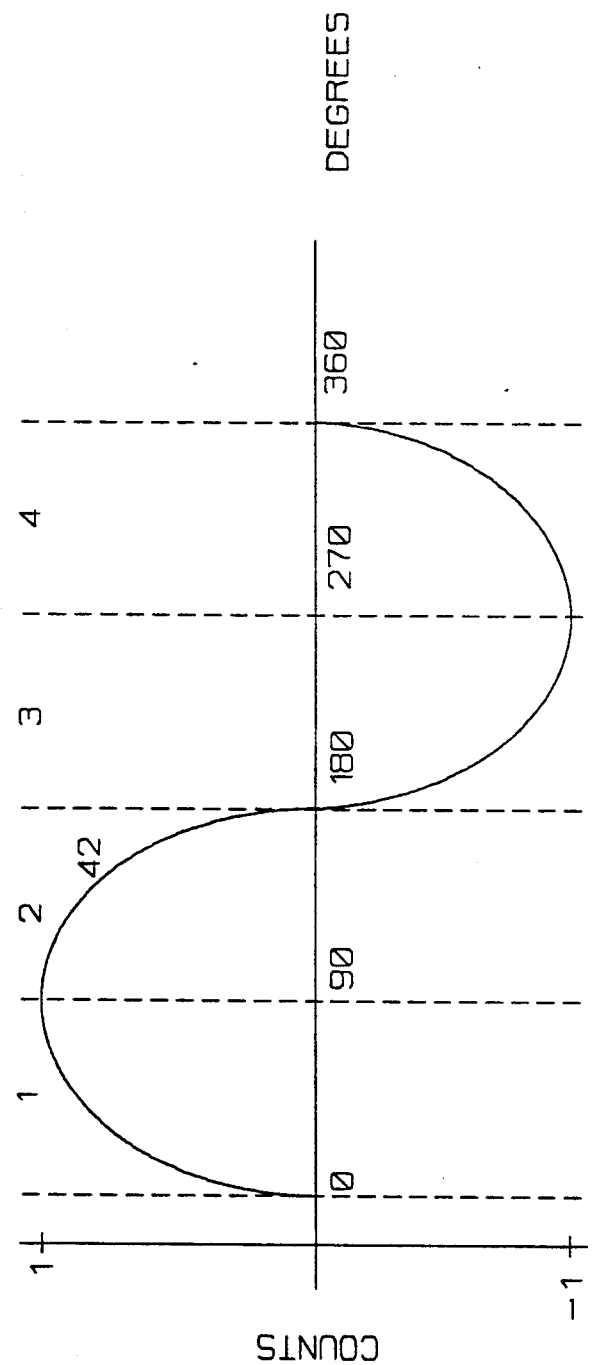
FIG. 2 is a graphic representation of a sinusoidal waveform stored within the wave shaping circuit of FIG. 1.

In FIG. 2, a Sine wave is depicted at 42 as consisting of quadrants 1–4 each representing one quarter of the progression of the Sine wave in radial degrees. The Cosine waveform, although not shown, is equal and opposite in magnitude and is 90 degrees out of phase with the Sine waveform and is similarly constructed from the four radial quadrants. By storing the values required to reconstruct the Sine and Cosine waveforms from 0 to 90 degrees in look-up tables contained within the EPROMs 14 and 15, the complete Sine and Cosine waveforms can be precisely reconstructed from the stored values. The detector circuit 48 provides indication to the counter circuit 50 as to the position of the current waveforms by determining whether the digital representation of the waveforms are all 1's or all 0's. Detection of all 1's is an indication that the waveform has reached its peak whereas detection of all 0's is an indication that the waveform is at its zero crossing. The occurance of either of these conditions results in a change in the direction input to the counter 12 over conductor 74. By referring to FIG. 2, note that the data in the first quadrant is a mirror of the data in the second quadrant. Recalling that the EPROM stores data from 0 to 90 degrees, as the counter counts up in quadrant 1, the data reaches the all 1's condition at the boundary between quadrants 1 and 2.

The counter is now directed to count down by the input from the counter direction circuit 50 over conductor 74 creating the wave form in quadrant 2. Data for quadrants 3 and 4 are identical to the data in quadrants 1 and 2 with the sign bit in the negative position. The sign bit for the D/A converters is controlled by the polarity circuit 49 over conductors 39 and 41. As the waveform from the EPROM 17 reaches the zero crossing point, as depicted in FIG. 2 at the boundary between quadrants 2 and 3, the sign of the waveform changes. The magnitude of the data is identical to the magnitude of the data in the first quadrant with the sign in the negative direction. By observing each time that the waveform reaches the zero position a polarity change occurs, the polarity circuit 49 accordingly controls the sign inputs to the D/A converters as follows.

The polarity circuit 49 contains binary counters 70 and 71 which are configured to toggle D/A sign outputs over conductors 39 and 41 for every other pulse on the full step signal 63. Since the full step output on conductor 63 is pulsed at every occurance of all 1's or all 0's. Outputs 39 and 41 from the counters are the sign inputs to the D/A converters 18 and 19, causing the output from the D/A converters to change sign at every zero crossing of the data from the EPROM 15.

Figure 3:
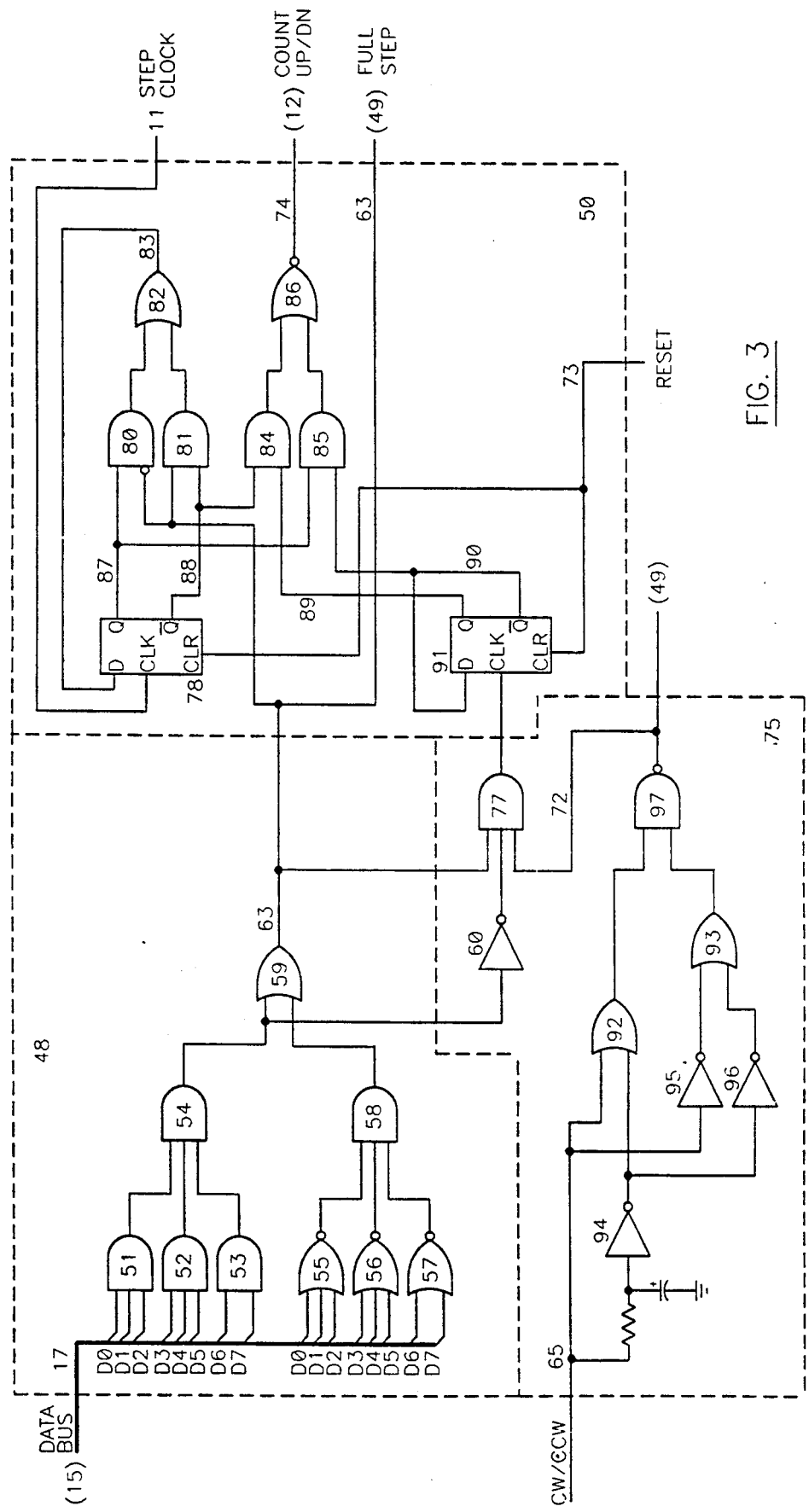
FIG. 3 is a diagrammatic representation of the components within the detector circuit, pulse stretcher circuit and counter circuit of FIG. 1.

The operation of the detector circuit 48, stretcher circuit 75 and the counter circuit 50 is best seen by referring now to FIG. 3. A clock pulse is inputted from the control microprocessor over conductor 11 to the clock terminal of a first flip flop 78 which is cleared by connection back to the microprocessor over conductor 98. The Q and $\overline{Q}$ outputs of the flip flop are compared within the AND gates 80, 81 that connects back to the D input of the flip flop through conductor 83. The Q and $\overline{Q}$ outputs are next compared within a pair of AND gates 84, 85 by connection over conductors 87, 88 with the Q and $\overline{Q}$ outputs of a second flip flop 91 over conductors 89, 90 and the output of the AND gates is compared within a NOR gate 86 which provides a pulse over conductor 74 back to the counter 12 within the driver circuit 10 of FIG. 1. Directional input as to whether the current waveform is in a all 1's or all 0's is determined within the detector circuit 48, by connection with the data bus 17 within the driver circuit 10 of FIG. 1 and which data bus connects with the EPROM 15 containing the stored Cosine waveform values as described earlier. The all 1's position Cosine current is determined by AND gates 51-53 having their inputs connected with the data bus 17 and having their outputs connected to a first output AND gate 54 for a determination as to when all the output data bits comprise 1's and which provide an input to an output OR gate 59, as indicated. The input data from data bus 17 is also provided to NOR gates 55-57 having their outputs connected to a second AND gate 58 for a determination as to when all the data bits are 0's. The output of the second AND gate 58 is compared with the output of the first output AND gate 54 within an output OR gate 59 and indication thereof is directed over conductor 63 to AND gates 80, 81 which are interconnected within the counter circuit 50. One input to the output OR gate 59 connects through an inverter 60 with a first input to an output AND gate 77 within the stretcher circuit 75. The output from the output OR gate 59 within the detector circuit 48 connects over conductor 63 with a second input to the output AND gate 77. The third input to the output AND gate 77 connects with the output of an output NAND gate 97 within the stretcher circuit 75. Motor direction input to the stretcher circuit 75 is obtained from the control microprocessor over conductor 65 which input is provided to a first input of an OR gate 92 and, through an inverter 94 to the second input of the NOR gate. The output of NOR gate 92 is connected to one input of an output NAND gate 97. The first and second inputs to the OR gate 92 are connected through a pair of inverters 95, 96 to the inputs of a second output NOR gate 93 and the output of the second output NOR gate is connected to the input of the output NAND gate 97. The output of the output NAND gate 97 connects with the polarity circuit 49 within the stepper driver circuit 10 of FIG. 1 over conductor 72. The output of the output AND gate 77 connects with the clock terminal of the second flip flop 91 within the counter circuit 50 having a connection with its clear terminal back with the control microprocessor over conductor 99 as indicated. The D output of the second flip flop 91 is connected with the Q output and with one input of the AND gate 85 within the counter circuit 50 over conductor 90. The $\bar{Q}$ output of the second flip flop 91 is connected with one input to the AND gate 84 for comparison with the Q output of the first flip flop 78 which was described earlier.

Figure 4:
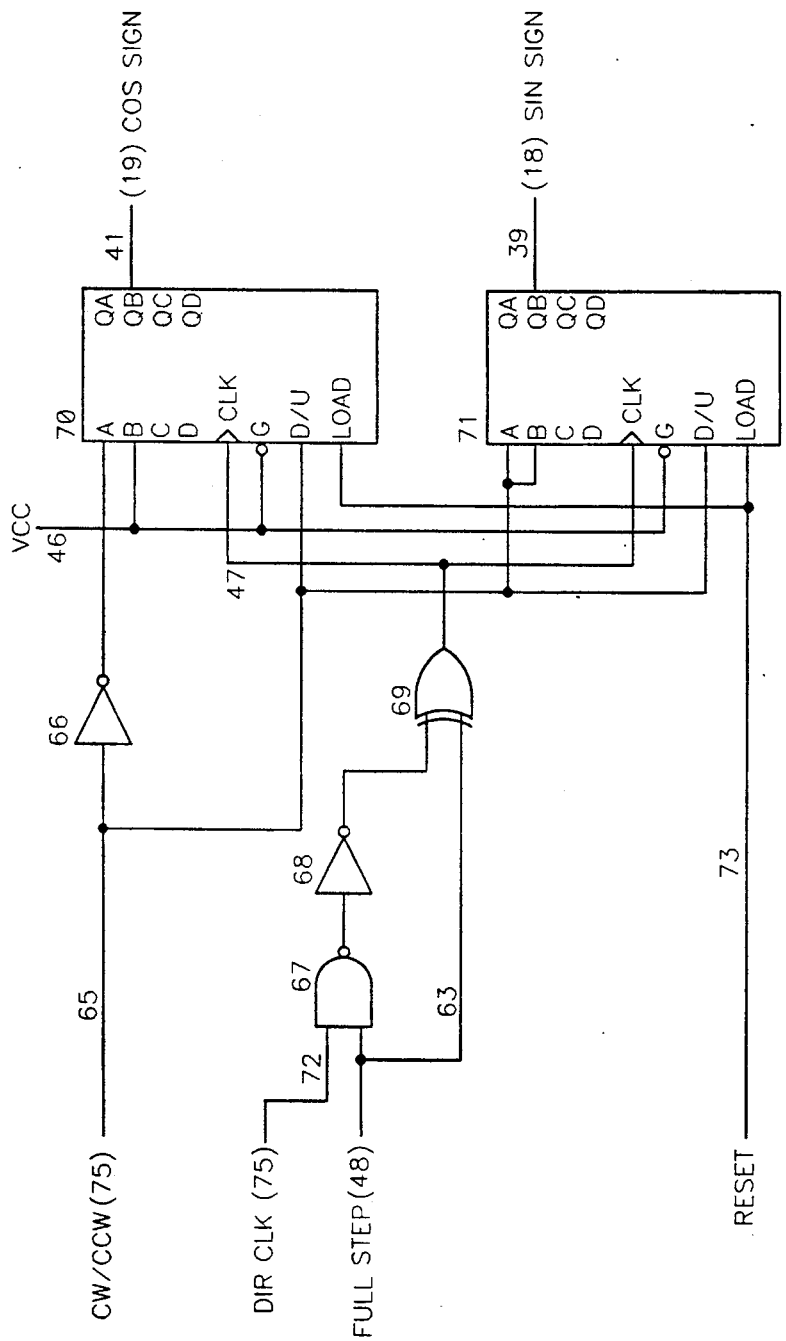
FIG. 4 is a diagrammatic representation of the components within the polarity circuit of FIG. 1.

The polarity of the Sine current and Cosine current waveforms is determined within the polarity circuit 49 of FIG. 4 wherein the directional data from the stretcher circuit 75 of FIG. 3 is applied over conductor 65 directly to the direction input of a first up-down counter 70 and to the preset A, preset B and direction input of a second up-down counter 71. Both counters 70 and 71 are of the common logic type MC74HC190 obtained from Motorola Inc.. Data from conductor 65 is also applied to the preset A input to counter 70 through an inverter 66. Input from the stretcher circuit 75 is applied to a first input of a NAND gate 67 over conductor 72 and from the counter circuit 50 to both the second input of the NAND gate as well as to the first input of a NOR gate 69 over conductor 63. The output of the NAND gate is inputted to the second terminal of the NOR gate 69 through an inverter 68. The output of the NOR gate 69 is applied to the clock terminals of the first up-down counter 70 and a second up-down counter 71 over conductor 47. The load inputs of both of the up-down counters connect back to the control microprocessor over conductor 73. A logic 1 is provided to the preset B and enable inputs of counter 70 and to the enable input of counter 71 by means of conductor 46. Outputs from counters 70 and 71 are inputted to the D/A converters 18, 19 within the driver circuit 10 of FIG. 1 over the conductors 39, 41 respectively. The Sine and Cosine waveforms are then accurately constructed at the outputs of the D to A converters 18,19 and is applied to comparators 26, 27.

The motor driver circuit 10 of FIG. 1 operates on this data in the following manner. The reference voltage constructed from the stored values indicative of the Sine and Cosine waveforms is then compared to the currents in the corresponding phase A and phase B windings 36, 37 by means of the comparators 26 and 27. The comparators connect with the phase A drive circuit 34 and the phase B drive circuit 35 over lines 28, 30, 23 and 29. The outputs of the comparators determine when the applied Sine and Cosine currents have reached their predetermined reference levels.

The slope detectors 24 and 25 monitor the reference voltage produced by the D/A converters to determine when the corresponding phase A current waveform and phase B current waveforms are falling or rising. The outputs of the slope detectors are inputted to the phase A and phase B drive circuits over lines 32 and 33 to implement the logic for the fast or slow decay selection in the manner described below.

The oscillator 40 directly produces the gating clock for the phase A and phase B drive circuits 34 and 35 and through an inverter 43 to determine when the phase A and phase B currents are applied to the corresponding phase A and phase B windings. The high voltage input to the drive circuits is provided by connection with the positive rail over conductor 38. The operation of the phase A and phase B drive circuits to switch the drive voltage across the phase A winding 36 and phase B winding 37 is more fully described in the aforementioned U.S. patent application (IMS-1).

It has thus been shown that by storing one quarter of a Sine and Cosine waveform, accurate reconstruction of the full waveform for driving current applied to the windings of a two-phase stepper motor can be achieved by means of detector, stretcher, polarity and counter circuits that are connected with the EPROMs and D/A converter elements used within the stepper motor driver circuit. The resulting cost and size of a stepper motor driver circuit is substantially reduced since the amount of memory required to store the Sine and Cosine data is reduced by 150%.

The complete Sine wave and Cosine wave information is stored in a look-up table contained within one of the EPROMS and such accurately constructed Sine wave and Cosine wave currents applied to the opposite windings within the stepper motor produce extremely accurate rotational control of the stepper motor position.

Having thus described our invention, what we claim as new and desire to secure by Letters Patent is:

1. A stepper motor drive circuit comprising:
   a binary counter having an input adapted for connection with a clock input from a control microprocessor and at least one output;
   a pair of first and second EPROMS connected with said binary counter output;
   a corresponding pair of first and second D/A converters connected with first and second data ports on said D/A converters;
   a wave-shaping circuit connecting with one of said EPROMS and said D/A converters determining direction and polarity of first and second charging currents to a pair of first and second stepper motor windings, said first charging current to said first winding having a partial sine wave configuration and said second charging current to said second winding having a partial cosine wave configuration, said wave-shaping circuit then reconstructing complete sine wave and cosine wave configurations to said first and second charging currents; and a first slope detector having an input connecting with an output on first A/D converter, an input to a first comparator and a first reference current value and a second slope detector having an input connecting with an output on said second A/D converter, an input to a second comparator and a second reference current value.

2. The stepper motor drive circuit of claim 1 including a first motor driver connecting with an output on said first slope detector, an output on said first comparator and another input on said first comparator, said first motor driver providing said first charging current to said first winding and a second motor driver connecting with an output on said second slope detector, an output on said second comparator and another input on said second comparator, said second motor driver providing said second charging current to second winding.

3. The stepper motor driver circuit of claim 1 including sine wave data stored in said first EPROM for constructing said sine wave from 0 to 90 degrees.

4. The stepper motor driver circuit of claim 1 including cosine wave data stored in said second EPROM for constructing said cosine wave from 0 to 90 degrees.

5. The stepper motor driver circuit of claim 1 wherein said wave-shaping circuit provides indication of peak and zero crossing positions of said partial sine and said partial cosine waveforms.

6. The stepper motor driver circuit of claim 2 including an oscillator connecting between said first and second motor drivers, said oscillator providing a first clock input pulse to said first motor driver and a second clock input pulse to said second motor driver.

7. The stepper motor driver circuit of claim 6 wherein said oscillator connects with said second motor driver through an inverter.

8. The stepper motor driver circuit of claim 1 wherein said wave-shaping circuit includes a detector circuit connecting with said first or second EPROM for determining direction of said first and second charging current.

9. The stepper motor driver circuit of claim 1 wherein said wave-shaping circuit includes a polarity circuit connecting with said first or second D/A converters providing indication of polarity of said first and second charging current.

10. The stepper motor driver circuit of claim 4 including a pulse stretcher circuit connected with said polarity circuit and with a control microprocessor, said pulse stretcher providing digital input data to said polarity circuit.

11. The stepper motor driver circuit of claim 8 wherein said wave-shaping circuit includes a counter circuit connecting with said detector circuit, said detector circuit, said pulse stretcher circuit and said polarity circuit, said counter circuit connecting with said control microprocessor and said binary counter thereby receiving partial data indicative of said partial sine wave and cosine wave configurations and providing said complete sine wave and cosine wave configurations from complete data stored within one of said first or second EPROMS.

12. The stepper motor driver circuit of claim 8 wherein said detector circuit comprises a first logic circuit connecting with said control microprocessor and one of said first or second EPROMS for determining whether said partial data comprises all 1's or 0's.

13. The stepper motor driver circuit of claim 8 wherein said first logic circuit comprises a plurality of first detector AND gates having their inputs interconnected with a corresponding plurality of first detector NOR gates.

14. The stepper motor driver circuit of claim 9 including a pair of second detector AND gates connected with said first detector AND gates and first detector NOR gates, said second detector AND gates having their outputs connected with a detector OR gate and with a first stretcher AND gate within said pulse stretcher circuit.

15. The stepper motor driver circuit of claim 4 wherein pulse stretcher circuit comprises a second logic circuit connecting with said control microprocessor and said detector circuit.

16. The stepper motor driver circuit of claim 11 wherein said second logic circuit comprises a plurality of first stretcher inverters interconnected together and with a pair of stretcher OR gates, said stretcher OR gates connecting with said detector circuit and said counter circuit through a stretcher NOR gate.

17. The stepper motor circuit of claim 4 wherein said counter circuit comprises a third logic circuit connecting with said control microprocessor and said polarity circuit.

18. The stepper motor circuit of claim 13 wherein said third logic circuit comprises a plurality of first and second counter AND gates interconnected with each other and with a pair of UP-DOWN counters, said UP-DOWN counters being connected with said control microprocessor.

19. The stepper motor circuit of claim 14 including a counter OR gate interconnecting said first counter AND gates with said first UP-DOWN counter and a counter NOR gate connecting said second UP-DOWN counter AND gates with said polarity circuit.

20. The stepper motor circuit of claim 4 wherein said polarity circuit comprises a fourth logic circuit including a first polarity NAND gate and a first polarity NOR gate interconnected together and with a pair of first and second polarity UP-DOWN counters, said first polarity UP-DOWN counter connecting between said stretcher circuit and said first D/A converter, said second polarity UP-DOWN counter connecting between said control microprocessor and said second D/A converter.

* * * * *